(12) United States Patent
Bettman et al.

(10) Patent No.: US 6,449,402 B1
(45) Date of Patent: Sep. 10, 2002

(54) METHOD AND APPARATUS FOR COMPENSATING AN OPTICAL FILTER

(75) Inventors: R. Brad Bettman, Mountain View; Ping Xie, San Jose; Peter Zupei Chen, Santa Clara, all of CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 09/617,790

(22) Filed: Jul. 18, 2000

Related U.S. Application Data (60) Provisional application No. 60/166,577, filed on Nov. 19, 1999.

(51) Int. Cl.[7] .................................................. G02B 6/34
(52) U.S. Cl. ........................................... 385/15; 385/37
(58) Field of Search ....................................... 385/37, 10

(56) References Cited

U.S. PATENT DOCUMENTS

| | | | |
|---|---|---|---|
| 5,007,705 A | 4/1991 | Morey et al. | |
| 5,042,898 A | 8/1991 | Morey et al. | |
| 5,844,667 A | 12/1991 | Maron | |
| 5,469,520 A | 11/1995 | Morey et al. | |
| 5,691,999 A | 11/1997 | Ball et al. | |
| 5,914,972 A * | 6/1999 | Siala et al. | 372/33 |
| 5,987,200 A * | 11/1999 | Fleming et al. | 385/37 |
| 5,999,671 A * | 12/1999 | Jin et al. | 385/37 |
| 6,016,702 A | 1/2000 | Maron | |
| 6,101,301 A * | 8/2000 | Engelberth et al. | 385/373 |
| 6,147,341 A * | 11/2000 | Lemaire et al. | 250/227.17 |
| 6,154,590 A * | 11/2000 | Jin et al. | 385/37 |
| 6,181,851 B1 * | 1/2001 | Pan et al. | 385/37 |
| 6,243,527 B1 | 6/2001 | Dawson-Elli | |

OTHER PUBLICATIONS

Int'l Search Report PCT/US00/31799; Int'l Filing date Nov. 17, 2000 Applicant: New Focus, Inc.

* cited by examiner

*Primary Examiner*—Hemang Sanghavi
*Assistant Examiner*—Scott A. Knauss
(74) *Attorney, Agent, or Firm*—Fish & Richardson P.C.

(57) ABSTRACT

A method and apparatus for compensating an optical filter is disclosed. The device substantially maintains the selected center wavelength in the optical filter across a range of operating temperatures. In an embodiment of the invention an optical filter is disclosed for filtering a selected channel among a plurality of multiplexed channels of an optical communication. The optical filter includes an optical fiber and an elongate housing. The optical fiber has a first side and a second side and a filter portion intermediate the first side and the second side, and the optical fiber for transmitting the multiplexed optical communication and the filter portion for filtering the selected channel. The elongate housing includes exposed end portions through which the optical fiber extends. The optical fiber is affixed at each exposed end portion. The exposed end portions exhibit between them a negative coefficient of thermal expansion sufficient to generate strains on the filter to substantially stabilize a filtered wavelength to substantially correspond with the selected channel during temperature variations. In an alternate embodiment of the invention the elongate housing is defined about a longitudinal axis and including a first anchor pad and a second anchor pad to which the filter portion is affixed. At least one of the anchor pads is at least initially movable in a plane intersecting the longitudinal axis to vary a strain on the filter portion to tune a center wavelength of the selected channel. In another embodiment of the invention an optical filter for filtering an optical signal is disclosed. In still another embodiment of the invention a method for compensating an optical filter is disclosed.

44 Claims, 7 Drawing Sheets

METHOD AND APPARATUS FOR COMPENSATING AN OPTICAL FILTER

CROSS REFERENCE TO RELATED APPLICATION

This application claims the benefit of prior filed co-pending Provisional Application No. 60/166,577 entitled "THERMALLY COMPENSATED MOUNT FOR BRAGG FILTERS" and filed on Nov. 19, 1999 which is incorporated herein by reference in its entirety.

BACKGROUND OF THE INVENTION

1. Field of Invention

This invention relates generally to communications, and more particularly, to compensating devices for optical filters.

2. Description of the Related Art

The telecommunications network serving the United States and the rest of the world is presently evolving from analog to digital transmission with ever increasing bandwidth requirements. Fiber optic cable has proved to be a valuable tool, replacing copper cable in nearly every application from large trunks to subscriber distribution plants. Fiber optic cable is capable of carrying much more information than copper with lower attenuation.

Currently this expansion of bandwidth is being accomplished by what is known as "wavelength division multiplexing" (WDM), in which separate subscriber/data sessions may be handled concurrently on a single optic fiber by means of modulation of each of those subscriber datastreams on different portions, i.e. channels, of the light spectrum. WDM is therefore the optical equivalent of frequency division multiplexing (FDM). Current implementations of WDM involve as many as 128 semiconductor lasers each lasing at a specific center frequency within the range of 1525–1575 nm. Each subscriber datastream is optically modulated onto the output beam of a corresponding semiconductor laser. The modulated information from each of the semiconductor lasers is combined onto a single optic fiber for transmission. As this digital signal is passed across an optical network, it will be subject at various intervals to amplification and dispersion compensation. These functions may be implemented while passively dropping or adding individual channels. A channel may be dropped/added by a device comprising an optical circulator with coupled optical filters which operates as an add/drop multiplexer (mux). An add/drop mux may be used to implement a simple form of optical network.

There are already known various constructions of optical filters, among them those which utilize the Bragg effect for wavelength selective filtering. The fiber Bragg grating filter is constructed by imprinting at least one periodic grating in the core of an optical fiber. The imprint may be achieved by exposing the core through the cladding to the interference pattern of two ultraviolet beams at an angle to one another. This results in a grating oriented normal to the fiber axis so that it reflects only that light having a wavelength within a very narrow range, back along the fiber axis opposite to the original propagation direction so that such reflected light is guided in the core to the point at which the original light had been launched into the fiber core. This grating is substantially transparent to the light for wavelengths outside the aforementioned narrow band so that it does not affect the further propagation of such other light. The incorporated grating of this kind produces a narrow transmission notch and a commensurately narrow reflective peak in the spectrum of light propagating in the optical fiber in one or the other of its longitudinal directions. The frequency of light affected in this manner by the incorporated periodic grating is related to the periodicity of the grating.

The requirement for the use of these filters in optical communication is that they maintain their stability as to the center wavelength/frequency of the reflected light over time and over the broad range of operating temperatures experienced in the field. These filters however exhibit wavelength sensitivity to variations in temperatures. The frequency of light reflected by such optical filters varies directly with the temperature of the grating region. Thus as the temperature of the element increases the wavelength of the reflected light increases. This precludes the use of the Bragg grating as a frequency standard absent suitable packaging for compensating the device for temperature. The frequency also varies directly with a mechanical strain on the grating region; as the strain on the grating increases the wavelength of the reflected light increases. Thus a compensation method that employs the mechanical sensitivity of the fiber to strain may be used to counteract the thermal sensitivity of the fiber.

Apparatus for compensating optical filters have been disclosed in the prior art. U.S. Pat. No. 5,042,898 entitled "Incorporated Bragg filter temperature compensated optical wave type device" issued on Aug. 27, 1991 discloses one such device. That device passively compensates for temperature variations with the announced effect of stabilizing the reflected wavelength of the filter. The device has a number of limitations including an inherently large form factor and a limited tuning ability.

What is needed is a compensating apparatus and method for optical filters with a reduced form factor and an increased tuning precision as compared with prior art devices.

SUMMARY OF THE INVENTION

A method and apparatus for compensating an optical filter is disclosed. The device substantially maintains the selected center wavelength in the optical filter across a range of operating temperatures. The optical filter may be used in a broad range of applications for one or more optical signals as a filter or a frequency reference. The device exhibits a low form factor and precise tuning capability.

In an embodiment of the invention an optical filter is disclosed for filtering a selected channel among a plurality of multiplexed channels of an optical communication system. The optical filter includes an optical fiber and an elongate housing. The optical fiber has a first side and a second side and a filter portion intermediate the first side and the second side, and the optical fiber for transmitting the multiplexed optical communication and the filter portion for filtering the selected channel. The elongate housing includes exposed end portions. The optical fiber is affixed at each exposed end portion. The filter portion is located between each of the exposed end portions. The exposed end portions exhibit between them a negative coefficient of thermal expansion sufficient to generate strains on the filter to substantially stabilize a filtered wavelength to substantially correspond with the selected channel during temperature variations.

In an alternate embodiment of the invention an optical filter is disclosed. The optical filter includes an optical fiber and an elongate housing. The optical fiber includes an intermediate filter portion. The optical fiber for transmitting the multiplexed optical communication and the filter portion for filtering the selected channel. The elongate housing is defined about a longitudinal axis and includes a first anchor pad and a second anchor pad. Opposing sides of said optic fiber adjacent the filter portion are affixed to a respective one of the first anchor pad and the second anchor pad within the elongate housing. At least one of the anchor pads is at least initially movable in a plane intersecting the longitudinal axis to vary a strain on the filter portion to tune a center wavelength of the selected channel.

In an alternate embodiment of the invention an optical filter for filtering an optical signal is disclosed. The optical filter includes an optical fiber and an elongate housing. The optical fiber with a first side and a second side and a filter portion intermediate the first side and the second side, and the optical fiber for filtering a selected wavelength of the optical signal. The elongate housing with opposing exposed end portions and said optical fiber affixed at each exposed end portion with the filter portion located between each of the exposed end portions, and the exposed end portions exhibit between them a negative coefficient of thermal expansion sufficient to generate strains on the filter to substantially stabilize the filtered wavelength during temperature variations.

In an alternate embodiment of the invention an optical filter for filtering an optical signal is disclosed. The optical filter includes an optical fiber and an elongate housing. The optical fiber includes an intermediate filter portion, and the optical fiber for transmitting the optical signal and the filter portion for filtering the optical signal. The elongate housing defined about a longitudinal axis and including a first anchor pad and a second anchor pad, and opposing sides of said optic fiber adjacent the filter portion affixed to a respective one of the first anchor pad and the second anchor pad within said elongate housing, and at least one of the anchor pads at least initially movable in a plane intersecting the longitudinal axis to vary a strain on the filter portion to tune a wavelength filtered by the filter portion.

In still another embodiment of the invention a method for compensating an optical filter to a selected channel within a plurality of multiplexed channels of an optical communication is disclosed. The method for compensating comprises the acts of:

tensioning an optical filter to a first strain level at which a wavelength of light filtered by the filter approximates a center wavelength of the selected channel;

affixing opposing sides of the optical filter to a first attachment pad and a second attachment pad displaced from one another along at least a z axis of an xyz Cartesian coordinate system; and moving at least one of the anchor pads in a plane intersecting the z axis to increase and decrease a strain on the filter portion to tune the optical filter to the center wavelength of the selected channel.

In still another embodiment of the invention a method for compensating an optical filter to a selected wavelength is disclosed. The method for compensating comprises the acts of:

tensioning an optical filter to a first strain level at which a wavelength of light filtered by the filter approximates a wavelength of the selected wavelength;

affixing opposing sides of the optical filter to a first attachment pad and a second attachment pad separated from one another along at least a "z" axis of an xyz axis Cartesian coordinate system; and moving at least one of the anchor pads in a plane intersecting the z axis to increase and decrease a strain on the filter portion to tune the optical filter to the selected wavelength.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

A method and apparatus for compensating an optical filter is disclosed. The device substantially maintains the selected center wavelength in the optical filter across a range of operating temperatures. The optical filter may be used in a broad range of applications for one or more optical signals as a filter or a frequency reference. The device exhibits a low form factor and precise tuning capability.

Figure 1A:
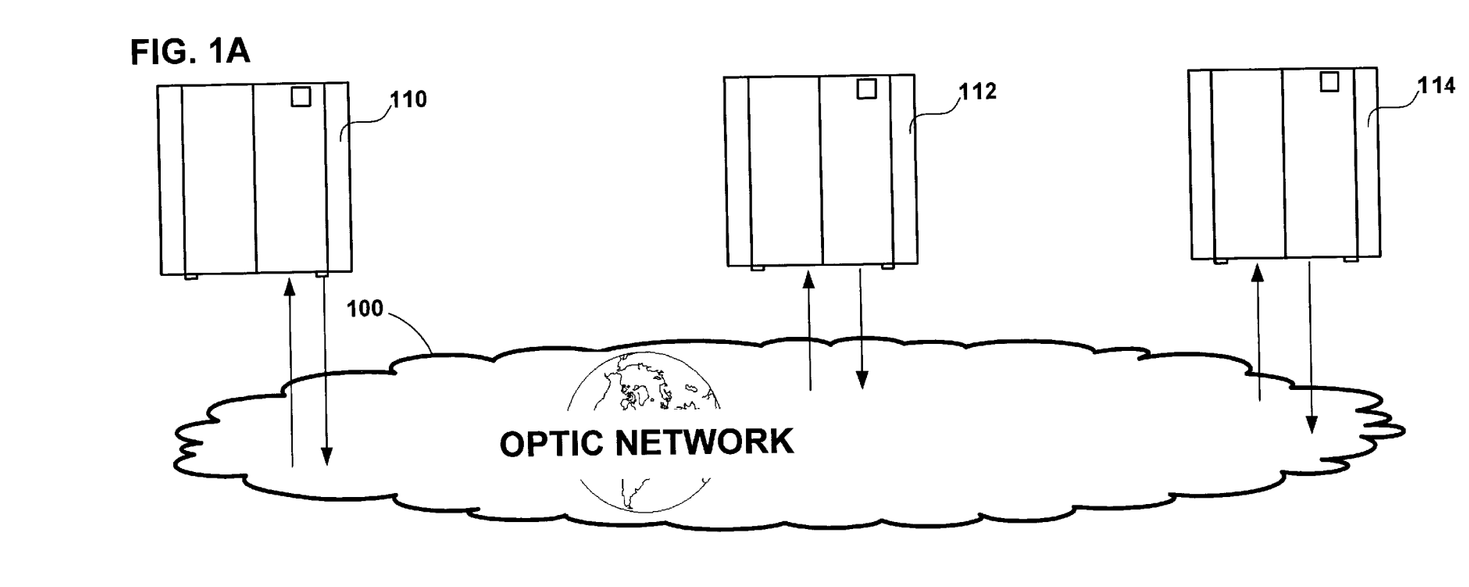
FIG. 1A shows an number of users connected to an optical network.

FIG. 1A shows a number of users 110–114 connected to a wavelength division multiplexed (WDM) optical network 100. A WDM network includes a plurality of channels multiplexed on a single optical fiber, each with a specific center wavelength. Individual users may interface with the network through add/drop multiplexers (mux) of varying degrees of complexity depending on the number of channels to be handled. An add/drop mux may also be used as part of the fiber conditioning equipment on the fiber links which join users. Over long haul optic networks fiber conditioning includes amplification and dispersion compensation. Devices used for add/drop mux are wavelength-selective.

Figure 1B:
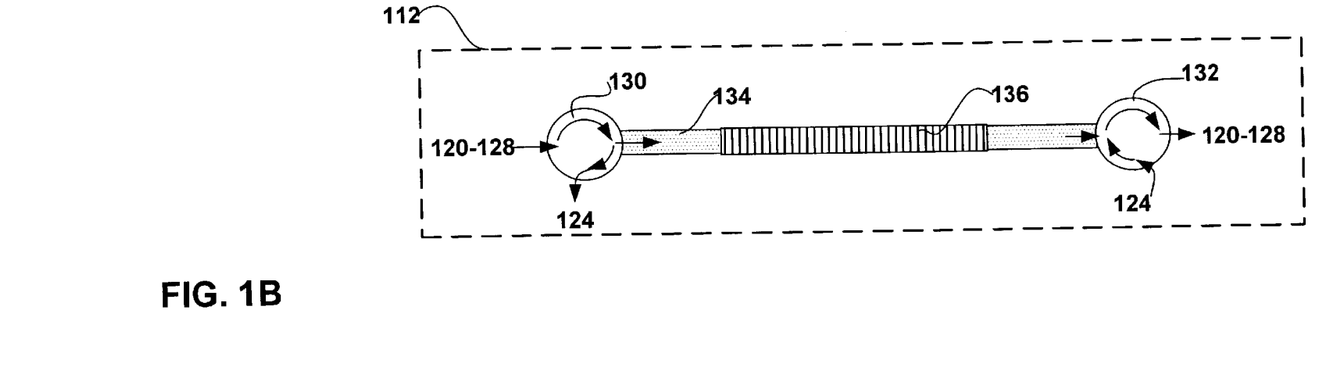
FIG. 1B is a schematic diagram of an add-drop multiplexer formed from an optical filter between a pair of circulators.

FIG. 1B shows one such wavelength-selective device, which is a Bragg filter sandwiched between two circulators. Circulators 130,132 are shown along with an optical filter 136. The optical filter in the embodiment shown is a Bragg filter created within the central region of optical fiber 134. The circulator has the property that the propagation direction of light determines the port at which light will be available. The Bragg filter has the property of passing all of the WDM channels except the channel(s) selected by the filter. That channel is reflected on a return path counter to the original propagation direction. The periodicity of the refractive variations within the filter determines the particular wavelength which it will reflect.

In operation, a plurality of WDM channels 120–128 is introduced into circulator 130. At circulator 130, light reflected from the Bragg element 136 which corresponds in wavelength with channel 124, is dropped at location 112. The remainder of the channels 120–122, 126–128 pass through the Bragg filter unimpeded and enter the second circulator 132. At that circulator the outgoing communication from location 112 on channel 124 is added to the optical communication stream with the result that the outgoing data stream includes channels 120–128. In this simple fashion, a number of users can communicate across an all-optical network or a channel can be conditioned by amplification, dispersion compensation, etc. The Bragg filter is ideal for such applications since it can be fabricated in a highly wavelength selective manner.

Figure 2:
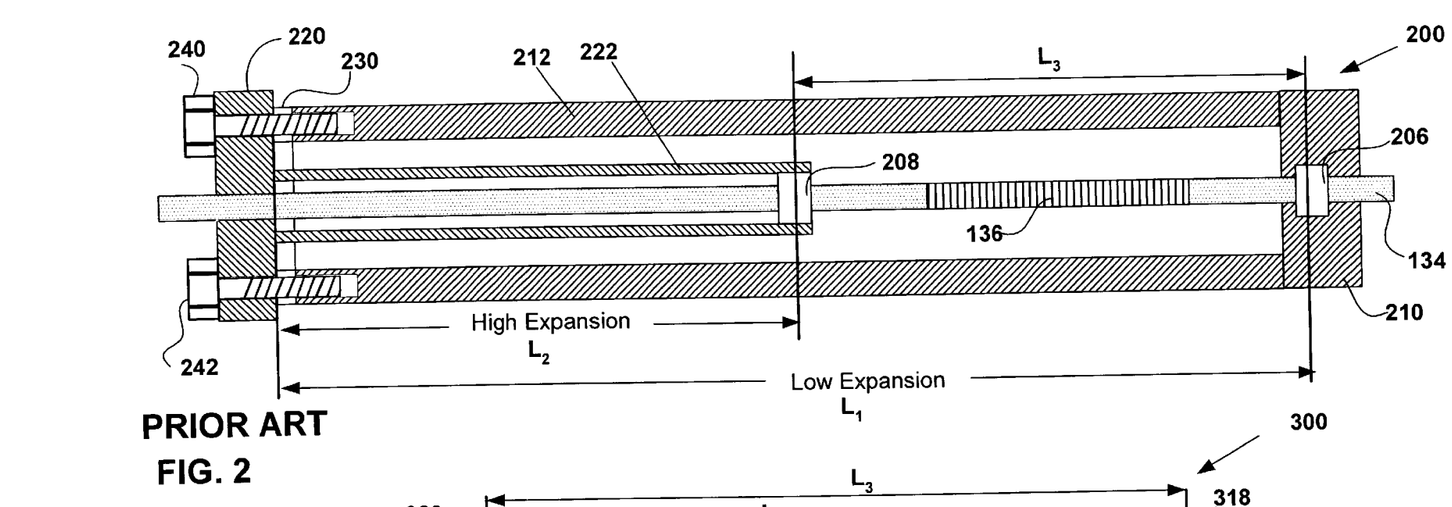
FIG. 2 is a cross-sectional elevation of a prior art package for compensating an optical filter.

FIG. 2 is a cross-sectional elevation view of a prior art package 200 for compensating an optical filter 136. The device includes a cup-shaped member, with a rim 212 and a base 210, and a re-entrant tube 222 with end cap 220. The end-cap is located adjacent the rim of the cup shaped member and the re-entrant tube extends down the length of cup interior toward the base. Within the base 210, of the cup-shaped member, an opening is defined. In that opening an anchor pad 206 is positioned. The anchor pad fastens one side of the optical fiber 134 to the base. The opposing side of the optical fiber is held at anchor pad 208, which is located proximate the base at the tip of the reentrant tubular member. The Bragg filter 136 is defined in the portion of the fiber between the anchor pads. The optical fiber extends beyond the base 210 on one end and the end cap 220 on the other. Threaded fasteners 240–242 fasten the end cap 220 to the rim portion 212 of the cup against the force of a resilient member 230 positioned between the end cap and rim.

The optical fiber 134, and in particular the Bragg filter portion of it 136, is pre-tensioned and affixed between anchor pads 206–208 at a strain level which produces approximately the appropriate wavelength of filtered light. A secondary adjustment of the filtered wavelength to correspond more closely with that of the selected channel is said to be achieved by means of threaded fasteners 240–242. These are threaded more or less in unison to decrease the strain on the optical filter, thus decreasing the wavelength of filtered light.

As the surrounding temperature varies, the combination of geometry and materials for the tube and cup produces a characteristic thermal response in terms of the absolute distance $L_3$ between anchor pads 206–208. Typically the thermal expansion coefficient of the rim is chosen to be less than that of the tube 222. Where the difference in expansion coefficient is large enough, the relatively high expansion of the tube along length $L_2$ exceeds the absolute expansion of the rim along the length $L_1$. Where this is the case the length $L_3$ will decrease as temperature increases. Thus the distance $L_3$ between anchor pads 206–208 varies inversely with temperature. Theoretically with proper choice of geometry and material expansion coefficients the strain on the fiber Bragg grating can be varied with temperature so as to substantially stabilize the wavelength of the light filtered by the filter across a range of operating temperatures. In reality such may not be the case, as the following discussion will indicate.

There are a number of disadvantages to this prior art arrangement. First, the device has a large form factor, i.e. several times the length of the Bragg Filter. This results from the re-entrant tube 222, which extends well into the interior of the cup 210–212. Second, at least one of the anchor points at which the fiber optic is fastened to the housing 200 is shrouded by the housing. This makes assembly and pre-tensioning awkward. Third, the precision of the final strain adjustment is limited both by the pitch of the threaded fasteners 240–242 as well as by the symmetry with which each of the fasteners can be tensioned. For example, the representative length of the Bragg filter element is 10–20 mm and the periodicity of the grating for WDM applications is 526 nm. A single turn of a fine 32 pitch thread generates 0.75 mm of travel. This is way outside the relevant tuning precision required for the device which is on the order of +−1.0 nm. Thus the prior art tuning mechanism is of limited effectiveness since its adjustment precision is far too coarse for the actual tuning that is required. Fourth, the anchor pads in the prior art device affix to materials with different thermal expansion coefficients. Pad 206 lies in the base which is typically a material with a low coefficient of expansion. Pad 208 lies in the tube which has a high coefficient of expansion. In an embodiment of the invention the attachment pads are solder or epoxy with a bond spread over several millimeters. The lack of precision in the bond is less critical where the material being fastened to has a low coefficient of expansion, because minor variations in the bond point do not generate large variations in the temperature related strain on the fiber. With the prior art design, however, at least one of the pads affixes to a material with a high coefficient of expansion thus introducing appreciable uncertainty in the thermal characteristics of the assembled package. Fifth, the tuning/strain adjustment of the device may not be invariant over the required twenty plus year product life required by the telecommunication industry. The final tension on the Bragg Filter is determined by the resilient member 230. Any degradation in the resilience of that member over the expected 20 year life of the filter will relax the strain on the filter thus shifting, in this case shortening, the filtered wavelength away from the desired center frequency.

Figure 3:
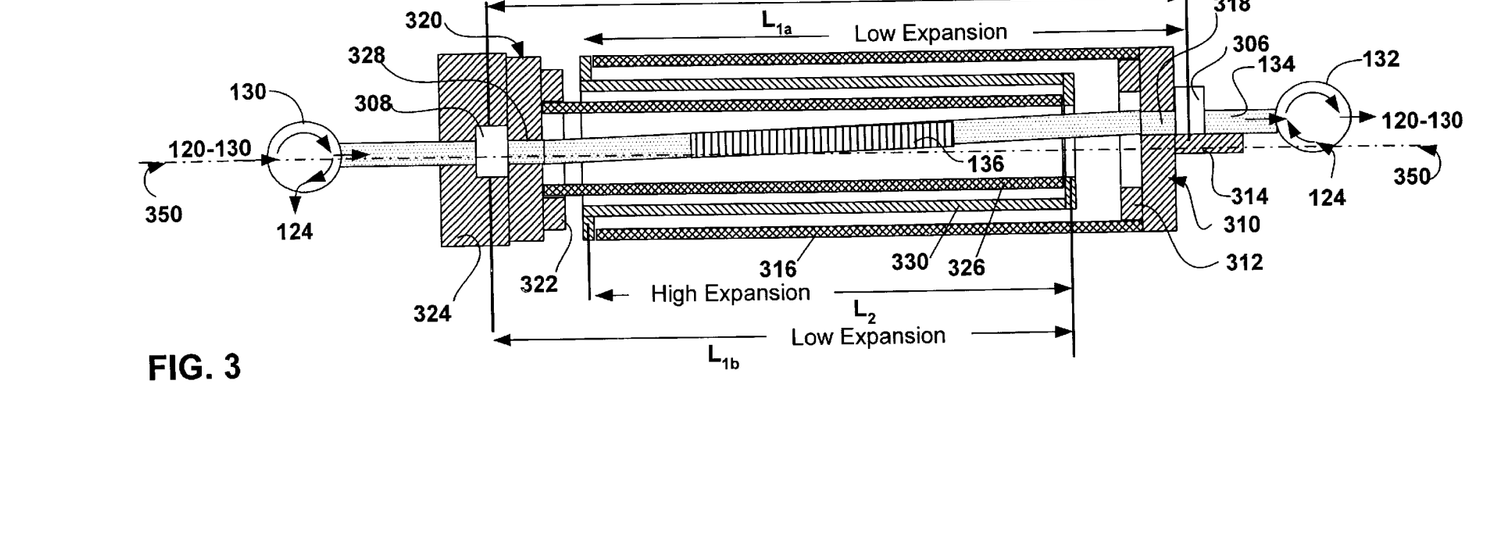
FIG. 3 is a cross-sectional elevation of an embodiment of the current invention for compensating an optical element.

FIG. 3 is a cross-sectional side view of a compensating device 300 with an optical filter 136 in accordance with an embodiment of the current invention. The device includes three concentric telescoped tubular members 316, 326, 330; and end caps 310,320. The tubes are concentric around a longitudinal axis 350. The exterior, intermediate, and interior tubular member 316, 330, 326 respectively, are joined end on end to form a folded, "Z" shaped thermal expansion path between end caps 310 and 320. The end caps are positioned on either exposed end of the assembly. The optical fiber 134 passes through openings 318, 328 in end caps 310, 320, respectively. The intermediate portion of the optical fiber includes the optical filter 136, which is positioned within the innermost of the tubes, 326.

End cap 310 includes a rim portion 312, the exterior circumference of which is dimensioned to fit rotatably within the interior of the outermost tube 316. This allows the initial rotation of that end cap within the tube about the longitudinal axis 350. Each of the tubes is fastened end to end serially to one another. Thus, at the end opposite end cap 310, exterior tube 316 is fastened to an end of intermediate tube 330. The opposite end of the intermediate tube is fastened to an end of interior tube 326. The opposing end of the interior tube couples to end cap 320. The interior tube couples to rim 322, which is part of end cap 320. In the embodiment shown, each end cap 310,320 defines an opening 318,328 respectively, which are displaced along normals to the longitudinal axis 350, about which each of the three tubes is concentric. The displacement of these openings allows for strain adjustment of the Bragg filter 136. This provides tuning/calibration capability which will be discussed in greater detail in connection with FIGS. 6A–B. Each end cap 310, 320 includes opposing exposed platforms 314, 324 respectively. These platforms facilitate bonding of the fiber to the end caps 310, 320 at attachment points 306, 308 respectively. The relative lengths and expansion coefficients of each of the tubular elements is chosen so as to provide the appropriate negative expansion coefficient between attachment points 306–308, so as to temperature stabilize the selected wavelengths of the optical filter 136. Typically, the exterior and interior tubes 316, 326 respectively, are fabricated from a material with a low coefficient of expansion such as Invar, quartz, ceramic, or graphite. The intermediate tube may be fabricated from a high coefficient of expansion material such as copper, aluminum, stainless steel or magnesium.

The free space Bragg wavelength is given by Equation 1:

$$\lambda = 2n\Lambda \qquad \text{Equation 1:}$$

where n is the refractive index of the fiber core and $\Lambda$ is the spacing of the Bragg grating filter elements. The change in Bragg wavelength for a temperature change of $\Delta T$ from ambient is given by Equation 2:

$$\frac{\Delta \lambda}{\lambda} = (\alpha_{f+\zeta})\Delta T + (1 - p_e)\Delta \varepsilon \qquad \text{Equation 2:}$$

where $a_f$ is the thermal expansion coefficient of the fiber, $\Delta\epsilon$ is the change in the strain, $\zeta$ is the thermo-optic coefficient for the fiber material and $p_e$ is the photo-elastic constant. The change in length of the optical fiber is given by Equation 3:

$$\Delta L_3 = (\alpha_{1a}L_{1a} + \alpha_{1b}L_{1b} - \alpha_2 L_2 - \alpha_f L_3)\Delta T \qquad \text{Equation 3:}$$

where $\alpha_{1a}L_{1a}$, $\alpha_{1b}L_{1b}$, $\alpha_2 L_2$, correspond to the rates with respect to temperature of the length change of the exterior, interior and intermediate tubes respectively. The normalized wavelength change per unit temperature change is given in terms of the length changes by the expression in Equation 4:

$$\frac{\Delta \lambda}{\lambda \Delta T} = (\alpha_{f+\zeta}) + (1 - p_e)\frac{(\alpha_{1a}L_{1a} + \alpha_{1b}L_{1b} - \alpha_2 L_2 - \alpha_f L_3)}{L_3} \qquad \text{Equation 4:}$$

To null out the temperature effects, the material constants and lengths are chosen so that the left side of the equality in Equation 4, i.e. the derivative of wavelength with respect to temperature, is zero.

The assembly of the device involves the following acts. Each of the tubular members is attached to an end of the appropriate tubular member. End cap 320 is coupled to interior tube 326. End cap 310 is coupled to exterior tube 316. At least one of the end caps is initially left freely rotatable about longitudinal axis 350. The optical fiber 134 is placed through openings 318, 328 in end caps 310, 320 respectively. The fiber is pre-tensioned to a level which results in a filtered wavelength approximately equal to that appropriate for the selected channel. Then the fiber is fastened by solder or epoxy or other means at attachment pads 306–308 to the housing 300. Next, an end cap, e.g. end cap 310, is rotated to decrease/increase the strain on the fiber so as to precisely tune the filtered wavelength to correspond with that of the selected channel. Once that configuration is achieved the end cap is fixed to the corresponding tube which in this example, is exterior tube 316. Next circulators 130–132 may be affixed to opposing ends of the fiber. This results in the basic configuration for an add/drop mux as discussed above in connection with FIG. 1B.

The embodiment of the invention shown exhibits a number of advantages over the prior art design shown in FIG. 2. First, the device has a reduced form factor compared with the prior art device. This results from the three tube design which positions the anchor points at the extreme ends of the package. Second, both the anchor points are exposed which makes their assembly significantly more precise. Third, the tuning mechanism has a granularity which allows precise adjustments within the appropriate wavelength range, i.e. +/−1.0 nm. The tuning is accomplished, as will be discussed in greater detail, in FIG. 6A, by rotating one or the other end cap within the tubular housing until the appropriate amount of tension is placed on the fiber to align the center wavelength with the appropriate channel. At that point the end cap may be permanently fastened to the tubular housing by soldering, welding, epoxy, fastener or other suitable technique. Fourth, the anchor pads are on the end caps and associated tubes which are both fabricated from materials with low coefficients of expansion, e.g. Invar and quartz, respectively so that the variations in thermal behavior of the device due to uncertainty in the location of the bonding point(s) are minimized. Fifth, the tuning/strain adjustment of the device should be invariant over the required twenty plus year product life required by the telecommunication industry because this device requires no preload springs or other resilient members which may relax over time.

Figure 4A:
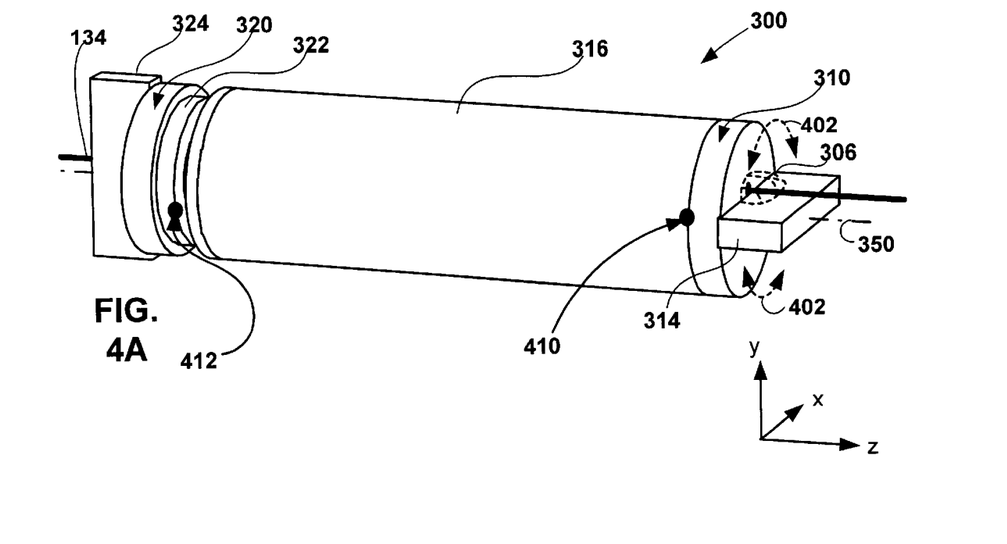
FIG. 4A is an isometric side view of the compensating device shown in FIG. 3.

FIG. 4A is an isometric side view of the assembled package and optical filter combination. The package/housing 300 is shown aligned about axis 350 which extends from one to the other end of the device. In the desired configuration the initial orientation of the two end caps is orthogonal to one another and with the longitudinal axis 350 centered on both end caps. After fastening either side of the filter to the anchor pads 306 and 308 (SEE FIG. 3) the strain on the optical filter may be either reduced or increased to shift the center wavelength into alignment with that of the appropriate channel. After such rotation 402, the end caps 310 and 320 can be seen affixed at locations 410,412 respectively to their respective tubular members. In contrast to the prior art device, the placement of both fastening or attachment points 306–308 on the end caps allows the joint to be kept compressively loaded against the exposed side of each end cap. This makes for a robust fastening arrangement. Secondly the end caps themselves are both fabricated from a relatively low expansion coefficient material such as Invar which minimizes the effect of any lack of precision in the solder or epoxy joints used to hold the fiber optic.

Figure 4B:
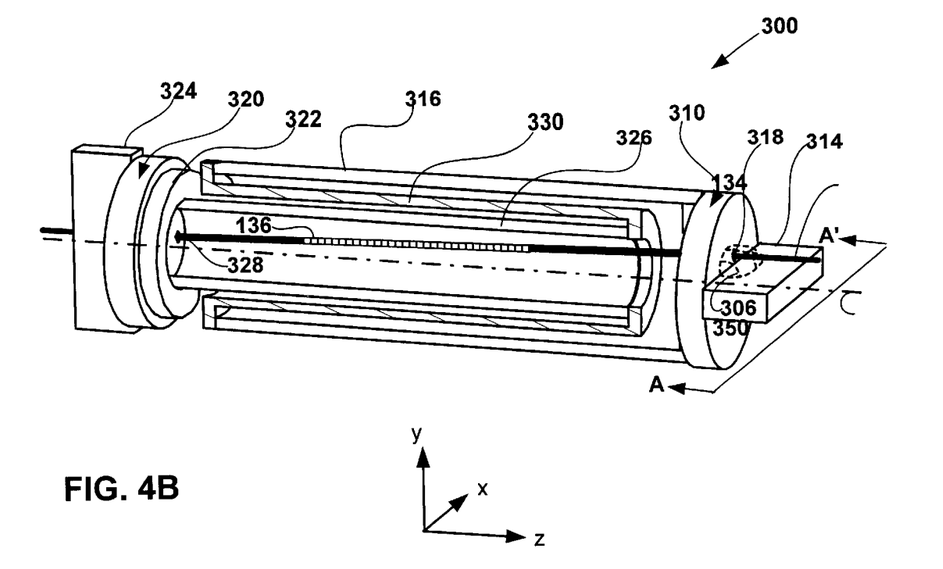
FIG. 4B is an isometric cross-section of the compensating device shown in FIG. 3.

FIG. 4B is an isometric cross-section of the package 300 shown in FIG. 4. The exterior, intermediate, and interior tubes 316, 330, 326 respectively are shown. The Bragg grating 136 is shown contained within the cylindrical space defined by interior tube 326. The fiber is shown passing through opening 328, defined within end cap 320 and opening 318, defined within end cap 310.

Figure 5A:
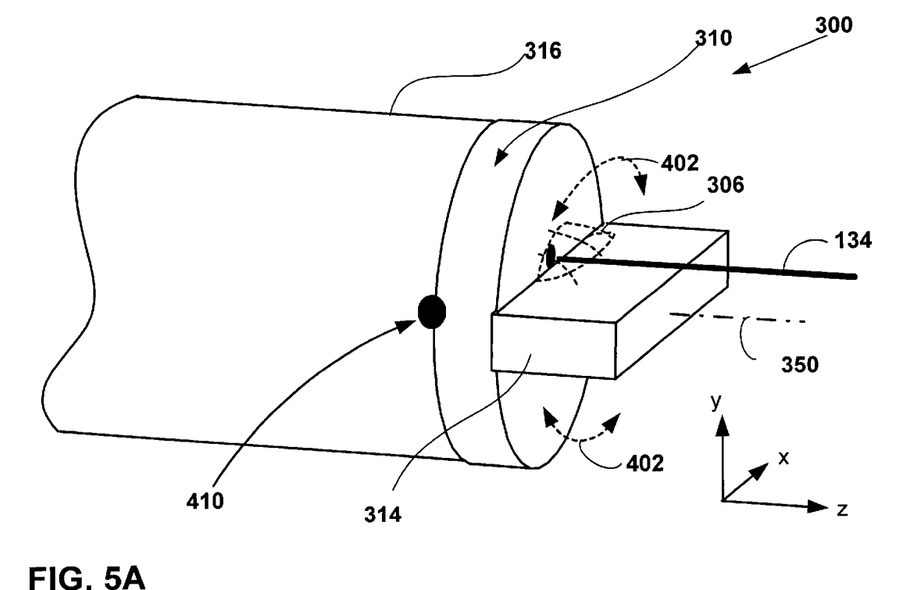
FIGS. 5A–B show alternate embodiments of a tuning portion of the compensating device shown in FIGS. 4A–B.

FIG. 5A is an enlarged view of the end cap 310 shown in FIGS. 3, 4A–B. The exposed platform 314, the optic fiber 134 and the attachment point 306 is shown.

Figure 5B:
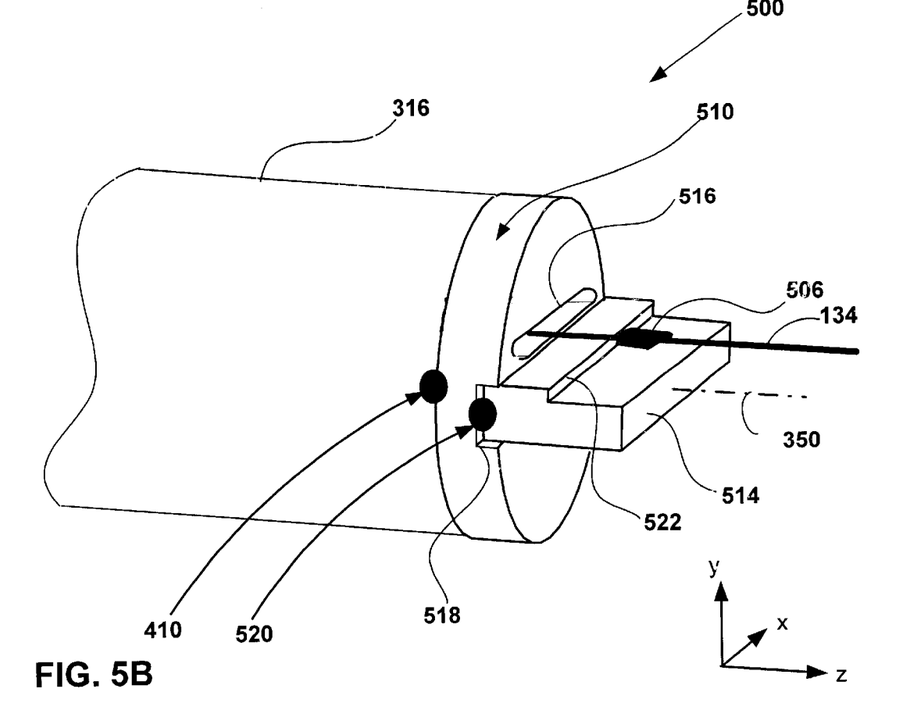

FIG. 5B shows an alternate embodiment of the end cap in which tuning is accomplished by linear movement of the slide bar 514 in a plane substantially normal to the longitudinal axis 350. The slide bar and end cap 510 are shown separate from one another. A groove 518 defined in the end cap 510 allows the slide bar to slide across the end cap in a plane substantially normal to the longitudinal axis. A step 522 defined in the slide bar facilitates fastening of the optical fiber 134 to the slide bar at attachment point 506. As discussed above, attachment may be made by weld, solder, epoxy, etc. An elongate opening 516 defined in the end cap 510 allows the fiber 134 to be moved normal to the longitudinal axis by sliding the slide bar within the groove defined in the end cap.

The assembly of the device proceeds as discussed above with the fiber pre-tensioned to a level which results in a filtered wavelength approximately equal to that appropriate for the selected channel. The end cap 510 is fastened, e.g. by weld 410, to the exterior tube 316. Then the fiber is fastened by solder or epoxy or other means at attachment pad 506 to the slide bar and by an opposing pad at the opposite end of the housing (not shown). Next, the slide bar 514 is moved linearly along the path defined by the groove 518 within end cap 510 to decrease/increase the strain on the fiber so as to precisely tune the filtered wavelength to correspond with that of the selected channel. Next, the slide bar is fixed, e.g. by weld 520, to the end cap 510. Finally, the longitudinal opening 516 around the fiber 134 may be sealed with, for example, an epoxy.

In the prior examples the housing has been shown as tubular members with substantially circular cross-sections. Such need not be the case provided rotary or linear tuning may be accomplished. A range of tubular cross sections may be utilized including: circular and rectangular.

Figures 6A, 6B:
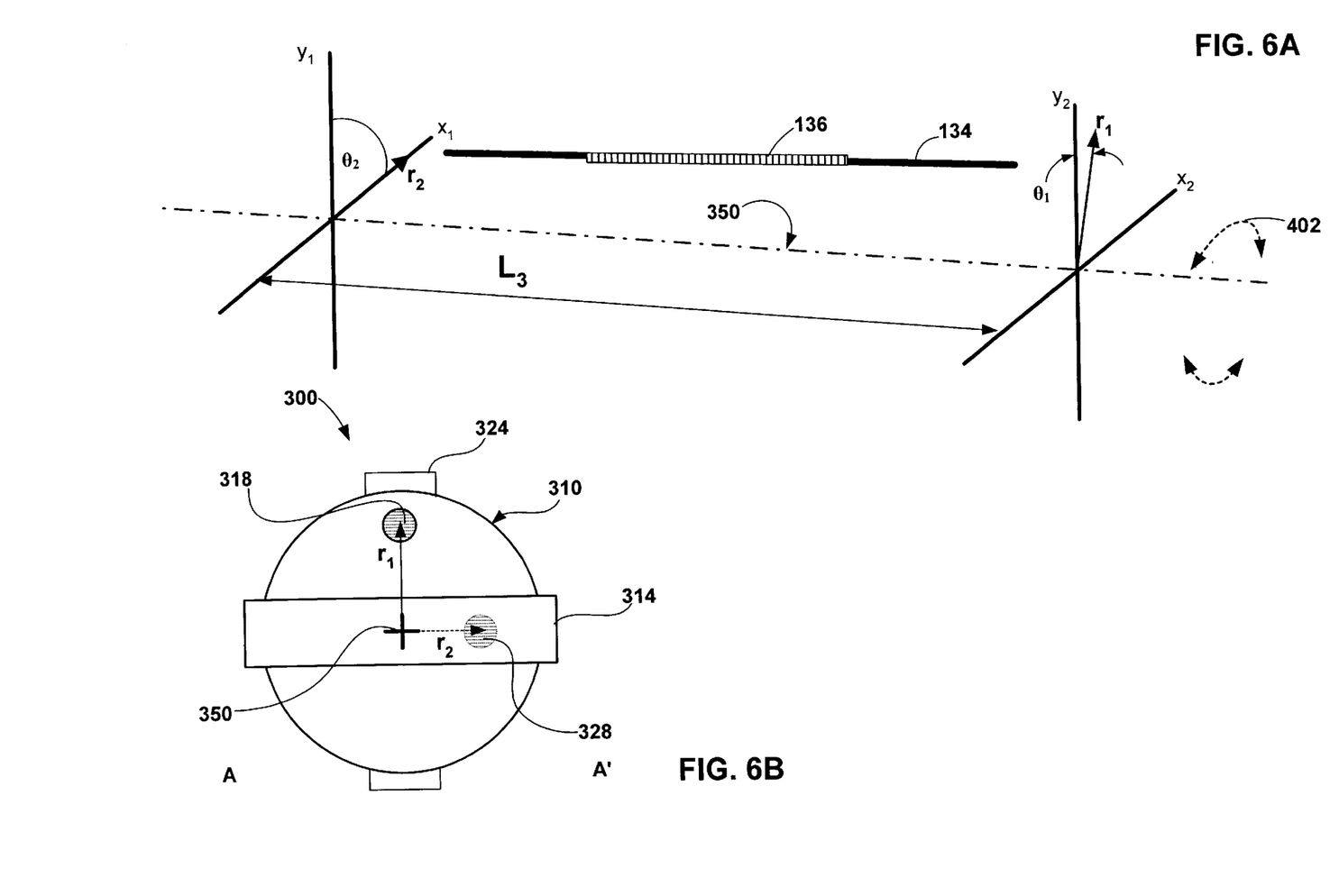
FIG. 6A is a three dimensional graph showing the arcuate tuning mechanism of an embodiment of the current invention.
FIG. 6B is an end view along line A—A of the compensating device shown in FIG. 3.

FIG. 6A is a three-dimensional graph showing the rotary tuning mechanism of an embodiment of the current invention. Two pairs of orthogonal axes labeled $x_1,y_1,z$ and $x_2,y_2,z$ are shown displaced from one another by a distance $L_3$ along the central axis 350. The placement of these pairs of origins of these orthogonal axes corresponds approximately with the locations of the centers end caps 310, 320 shown in FIGS. 3–5. Each cap is centered on a common z axis. Two vectors, $r_1$, and $r_2$, are shown on either of the xyz axis. The tip of the vector $r_1$ corresponds with the attachment pad 306 (not shown) at the opening 318 (see FIGS. 3–5) defined within cap 310. The tip of vector $r_2$ corresponds with the attachment pad 308 (not shown) at the opening 328 defined within the opposing end cap 320. Both of these openings are, in the embodiment shown, displaced along normals to the longitudinal axis 350. During the initial setup, when the fiber optic is stretched and fastened at anchor pads 306–308 the preferred orientation of vectors $r_1$ and $r_2$ is substantially normal to one another. Thus if $r_2$ aligns with the $x_1$ axis then $r_1$ aligns with the $y_2$ axis. In this configuration a counter-clockwise rotation of end cap 310 will move the attachment pad 306 and opening 318 further from attachment pad 308 and opening 328. This elongates the fiber optic and increases the strain in the optical filter 136, thereby increasing the center wavelength which is filtered by that filter. Conversely clockwise rotation from this initial orientation will decrease the distance between the attachment pads 306–308, thus reducing the wavelength of filtered light. A high degree of flexibility and precision can be obtained by this arrangement. The magnitude of the displacement of vectors $r_1$, and $r_2$ normal to longitudinal axis 350, the separation between end caps, and the amount of rotation of the end cap(s) governs the resultant tuning range. The displacements of the vectors $r_1$, and $r_2$ need not be the same.

FIG. 6B is an end view of the optical filter package 300 shown in FIG. 5 along the direction indicated by arrows A–A'. The location of longitudinal axis 350 is shown with cross hairs. Attachment pad 306 (not shown) at opening 318 is shown at the terminus of vector $r_1$. Attachment pad 308 (not shown) at opening 328 (shown in phantom) is shown at the terminus of vector $r_2$. The platforms 314 and 324 associated with respectively end caps 310 and 320 are shown aligned initially orthogonal to one another.

Figure 7:
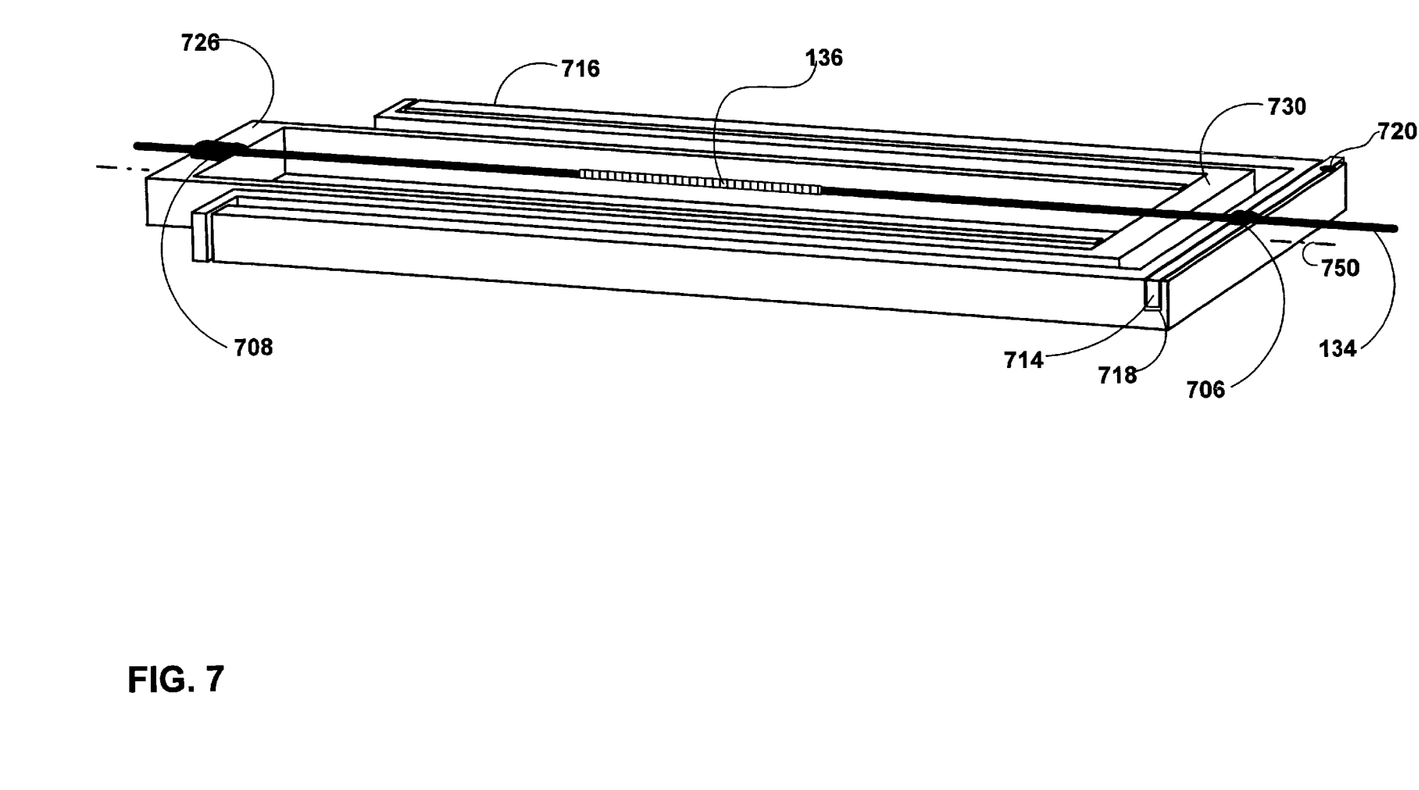
FIG. 7 is an isometric side view of an alternate embodiment of the device for compensating an optical element.

FIG. 7 is an isometric side view of an alternate embodiment of the device for compensating an optical element. In this embodiment an elongate housing with a planar set of members is shown in a "Z" shaped configuration substantially corresponding to the cross sectional isometric view shown in FIGS. 3 and 4B. The elongate housing is defined about a longitudinal axis 750. In this embodiment an exterior "C" shaped member 716, an intermediate "C" shaped member 730, and an interior "C" shaped member 726 are shown. The open end or rim of exterior member 716 is fastened to an open end of intermediate member 730. The base of intermediate member 730 is fastened to the open end of interior member 726. A groove 718 is defined within the base of exterior member 716. A slide bar 714 is located in the groove for slidable movement therein in a plane substantially normal to the longitudinal axis 750. The optical fiber is fastened on opposite sides of the Bragg filter at attachment pads 706–708 to the slide bar 714 within the base of exterior member 716 and to the base of the interior member 726 respectively. In an alternate embodiment of the invention the slide bar may be present on either/both ends of the assembly.

The assembly of the device proceeds as discussed above with the fiber pre-tensioned to a level which results in a reflected wavelength approximately equal to that appropriate for the selected channel. Then the fiber is fastened by solder or epoxy or other means at attachment pad 706 by which the fiber is fastened to slide bar 714 and at attachment pad 708 by which the fiber is fastened to the base of the interior member 726.

The location of attachment pad 706 is displaced from the center position defined by axis 750. This allows the tension on the fiber to be increased or decreased after attachment to the slide bar. Next, the slide bar is moved linearly along the path defined by the groove 718 within the base of exterior member 716 to decrease/increase the strain on the fiber so as to precisely tune the filtered wavelength to correspond with that of the selected channel. Next, the slide bar 714 is fixed, e.g. by weld 720, to the base of exterior member 716. Finally, the assembly is hermetically sealed.

In an alternate embodiment of the invention the groove 718 for the slide bar 714 is located in a plane which intersects the longitudinal axis 750. This allows the fiber tension to be increased or decreased relative to any initial location of the attachment pad 706.

Figure 8:
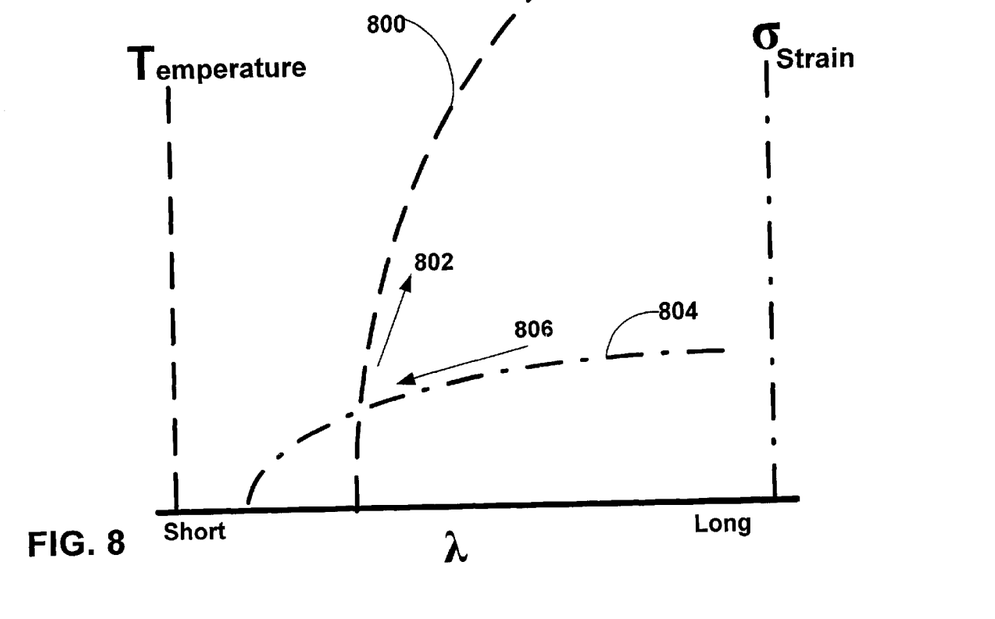
FIG. 8 is a graph correlating the wavelength of the optical filter as independent functions of strain and of temperature.

FIG. 8 is a graph correlating filtered wavelength of the optical filter as independent functions of temperature and strain. Line 800 shows the correlation between temperature and wavelength. Increasing temperature results in an increase in the wavelength of light filtered by the optical filter. Line 804 shows the correlation between strain and wavelength. Increasing strain results in an increase in the wavelength of light filtered by the optical filter and the increase is more severe than that produced by temperature. The housing/package is designed so that as temperatures increase the distance $L_3$ between anchor points decreases providing strain relief 806 in the optical filter in an amount which offsets what would otherwise be a temperature related increase 802 in the wavelength filtered by the optical filter. The properly designed housing can thus result in an accurately compensated optical filter with a center wavelength substantially invariant, across a wide range of temperatures and operating conditions.

In the embodiments of the invention discussed above the filter operates by reflecting a selected wavelength. In alternate embodiments of the invention the compensated optical filter portion of the optical fiber may perform as a narrow band transmitter, e.g. an etalon. In this alternate embodiment of the invention, filtering of the selected wavelength involves transmission rather than reflection. The above discussed devices for temperature stabilizing may be applied with equal advantage to temperature stabilize such a filter as well.

Figure 9:
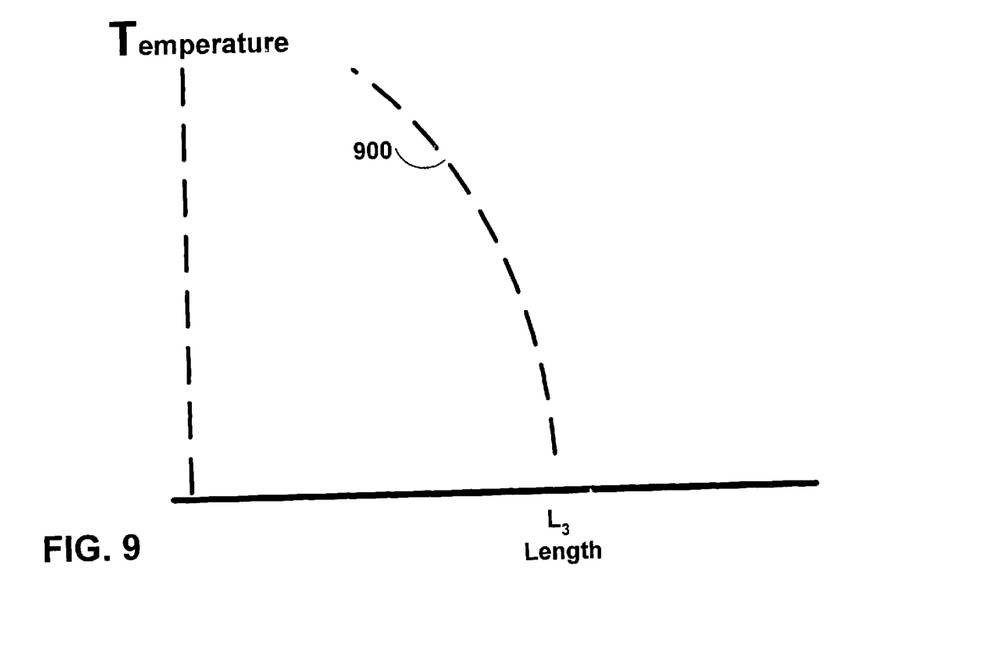
FIG. 9 is a graph correlating the length between anchor points for the compensated optical filter with temperature.

FIG. 9 is a graph relating compensated length $L_3$ between anchor points 306–308 as a function of temperature. The desired mechanical behavior is shown in line 900 which exhibits a negative coefficient of expansion across the operating range of temperatures to which the package will be subjected. The above discussed device, shown in FIGS. 3–6, provides such a capability.

The temperature stabilized optical filter of the current invention may be used in a broad range of applications for multiplexed optical signals, e.g. channels, as discussed above, or for a single signal/channel. In an embodiment of the invention the temperature stabilized optical filter may be coupled to an optical signal source as part of a closed loop feedback circuit. In such an application the high finesse temperature stabilized optical fiber Bragg grating may be used to monitor the exact amount of energy radiated by the signal source at the center frequency of the Bragg grating. This determination can be used to stabilize the frequency or energy level of the signal source.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An optical filter for filtering a selected channel among a plurality of multiplexed channels of an optical communication, and the optical filter comprising:

an optical fiber with a first side and a second side and a filter portion intermediate the first side and the second side, and the optical fiber for transmitting the multiplexed optical communication and the filter portion for filtering the selected channel;

an elongate housing with opposing exposed end portions and said optical fiber affixed at each exposed end portion with the filter portion located between each of the exposed end portions, and the exposed end portions exhibit between them a negative coefficient of thermal expansion sufficient to generate strains on the filter to substantially stabilize a filtered wavelength to substantially correspond with the selected channel during temperature variations;

a first anchor pad and a second anchor pad, and opposing sides of said optic fiber adjacent the filter portion affixed to a respective one of the first anchor pad and the second anchor pad within the elongate housing, and each of the anchor pads displaced along a corresponding normal to the longitudinal axis and at least one of the anchor pads at least initially rotatable about the longitudinal axis in a plane which intersects the longitudinal axis to vary a strain on the filter portion to tune a center wavelength of the selected channel filtered by the filter portion.

2. An optical filter for filtering a selected channel among a plurality of multiplexed channels of an optical communication, and the optical filter comprising:

an optical fiber with a first side and a second side and a filter portion intermediate the first side and the second side, and the optical fiber for transmitting the multiplexed optical communication and the filter portion for filtering the selected channel;

an elongate housing with at least three substantially overlapping tubular members substantially concentric about a longitudinal axis and each of said at least three tubular members joined serially to one another to form a "Z" shaped cross section with opposing exposed end portions and said optical fiber affixed at each exposed end portion with the filter portion located between each of the exposed end portions, and the exposed end portions which exhibit between them a negative coefficient of thermal expansion sufficient to generate strains on the filter to substantially stabilize a filtered wavelength to substantially correspond with the selected channel during temperature variations.

3. An optical filter for filtering a selected channel among a plurality of multiplexed channels of an optical communication, and the optical filter comprising:

an optical fiber with a first side and a second side and a filter portion intermediate the first side and the second side, and the optical fiber for transmitting the multiplexed optical communication and the filter portion for filtering the selected channel;

an elongate housing with at least three "C" shaped members joined serially to one another to form a "Z" shaped cross section with opposing end portions and said optical fiber affixed at each exposed end portion with the filter portion located between each of the exposed end portions, and the exposed end portions which exhibit between them a negative coefficient of thermal expansion sufficient to generate strains on the filter to substantially stabilize a filtered wavelength to substantially correspond with the selected channel during temperature variations.

4. The optical filter of claim 3, further comprising:

a pair of circulators and each of said pair of circulators coupled to opposing sides of said optic fiber for respectively dropping and adding the selected one among the plurality of channels.

5. The optical filter of claim 3, wherein said filter portion includes a Bragg grating.

6. The optical filter of claim 2, further comprising:

a pair of end caps each dimensioned to couple with opposing ends of said at least three tubular members and each of the end caps defining an opening therein for positioning the optic fiber along a corresponding normal to the longitudinal axis and at least one of the end caps at least initially rotatable about the longitudinal axis to vary a strain on the filter portion to tune a center wavelength of the selected channel filtered by the filter portion.

7. The optical filter of claim 2, wherein:

an exterior one of said at least three tubular members together with an interior one of said at least three tubular members exhibits a first coefficient of thermal expansion, and an intermediate one of said at least three tubular members located between said exterior one and said interior one of said at least three tubular members exhibits a second coefficient of thermal expansion greater than the first coefficient of thermal expansion.

8. The optical filter of claim 7, wherein:

a material component of the exterior one of said at least three tubular members together with an interior one of said at least three tubular members includes at least one of: quartz, Invar, ceramic, and graphite.

9. The optical filter of claim 7, wherein:
a material component of the intermediate one of said at least three tubular members includes at least one of: copper, aluminum, stainless steel and magnesium.

10. The optical filter of claim 3, wherein:
an exterior one of said at least three "C" shaped members together with an interior one of said at least three "C" shaped members exhibits a first coefficient of thermal expansion, and an intermediate one of said at least three "C" shaped members located between said exterior one and said interior one of said at least "C" shaped members exhibits a second coefficient of thermal expansion greater than the first coefficient of thermal expansion.

11. The optical filter of claim 10, wherein:
a material component of the exterior one of said at least "C" shaped members together with an interior one of said at least three "C" shaped members includes at least one of: quartz, Invar, ceramic, and graphite.

12. The optical filter of claim 10, wherein:
a material component of the intermediate one of said at least three "C" shaped members includes at least one of: copper, aluminum, stainless steel and magnesium.

13. An optical filter for filtering a selected channel among a plurality of multiplexed channels of an optical communication, and the optical filter comprising:
an optical fiber with an intermediate filter portion, and the optical fiber for transmitting the multiplexed optical communication and the filter portion for filtering the selected channel; and
an elongate housing defined about a longitudinal axis and including a first anchor pad and a second anchor pad, and opposing sides of said optic fiber adjacent the filter portion affixed to a respective one of the first anchor pad and the second anchor pad within said elongate housing, and each of the anchor pads displaced along a corresponding normal to the longitudinal axis and at least one of the anchor pads at least initially rotatable about the longitudinal axis in a plane intersecting the longitudinal axis to vary a strain on the filter portion to tune a center wavelength of the selected channel filtered by the filter portion.

14. An optical filter for filtering a selected channel among a plurality of multiplexed channels of an optical communication, and the optical filter comprising:
an optical fiber with an intermediate filter portion, and the optical fiber for transmitting the multiplexed optical communication and the filter portion for filtering the selected channel; and
an elongate housing defined about a longitudinal axis and including a first anchor pad and a second anchor pad, and opposing sides of said optic fiber adjacent the filter portion affixed to a respective one of the first anchor pad and the second anchor pad within said elongate housing, and at least one of the anchor pads at least initially movable in a plane intersecting the longitudinal axis to vary a strain on the filter portion to tune a center wavelength of the selected channel, and the elongate housing including at least three substantially overlapping tubular members substantially concentric about a longitudinal axis and each of said at least three tubular members joined serially to one another to form a z shaped cross section with opposing exposed end portions which exhibit between them a negative coefficient of thermal expansion sufficient to generate strains on the filter to substantially stabilize a filtered wavelength to substantially correspond with the selected channel during temperature variations.

15. An optical filter for filtering a selected channel among a plurality of multiplexed channels of an optical communication, and the optical filter comprising:
an optical fiber with an intermediate filter portion, and the optical fiber for transmitting the multiplexed optical communication and the filter portion for filtering the selected channel; and
an elongate housing defined about a longitudinal axis and including a first anchor pad and a second anchor pad, and opposing sides of said optic fiber adjacent the filter portion affixed to a respective one of the first anchor pad and the second anchor pad within said elongate housing, and at least one of the anchor pads at least initially movable in a plane intersecting the longitudinal axis to vary a strain on the filter portion to tune a center wavelength of the selected channel, and the elongate housing including at least three "C" shaped members joined serially to one another to form a "Z" shaped cross section with opposing end portions which exhibit between them a negative coefficient of thermal expansion sufficient to generate strains on the filter to substantially stabilize a filtered wavelength to substantially correspond with the selected channel during temperature variations.

16. The optical filter of claim 15, further comprising:
a pair of circulators and each of said pair of circulators coupled to opposing sides of said optic fiber for respectively dropping and adding the selected one among the plurality of channels.

17. The optical filter of claim 15, wherein said filter portion includes a Bragg grating.

18. The optical filter of claim 14, further comprising:
a pair of end caps each dimensioned to couple with opposing ends of said at least three tubular members and each of the end caps defining an opening therein for positioning the optic fiber along a corresponding normal to the longitudinal axis and at least one of the end caps at least initially rotatable about the longitudinal axis to vary a strain on the filter portion to tune a center wavelength of the selected channel filtered by the filter portion.

19. The optical filter of claim 14, wherein:
an exterior one of said at least three tubular members together with an interior one of said at least three tubular members exhibits a first coefficient of thermal expansion, and an intermediate one of said at least three tubular members located between said exterior one and said interior one of said at least three tubular members exhibits a second coefficient of thermal expansion greater than the first coefficient of thermal expansion.

20. The optical filter of claim 19, wherein:
a material component of the exterior one of said at least three tubular members together with an interior one of said at least three tubular members includes at least one of: quartz, Invar, ceramic, and graphite.

21. The optical filter of claim 19, wherein:
a material component of the intermediate one of said at least three tubular members includes at least one of: copper, aluminum, stainless steel and magnesium.

22. The optical filter of claim 15, wherein:
an exterior one of said at least three "C" shaped members together with an interior one of said at least three "C"

shaped members exhibits a first coefficient of thermal expansion, and an intermediate one of said at least three "C" shaped members located between said exterior one and said interior one of said at least three "C" shaped members exhibits a second coefficient of thermal expansion greater than the first coefficient of thermal expansion.

23. The optical filter of claim 22, wherein:
a material component of the exterior one of said at least "C" shaped members together with an interior one of said at least three "C" shaped members includes at least one of: quartz, Invar, ceramic, graphite.

24. The optical filter of claim 22, wherein:
a material component of the intermediate one of said at least three "C" shaped members includes at least one of: copper, aluminum, stainless steel and magnesium.

25. A method for compensating an optical filter to a selected channel within a plurality of multiplexed channels of an optical communication and the method for compensating comprising the acts of:
tensioning an optical filter to a first strain level at which a wavelength of light filtered by the filter approximates a center wavelength of the selected channel;
locating a first attachment pad displaced from an origin along the x axis and a second attachment pad displaced from the origin substantially along the y axis;
affixing opposing sides of the optical filter to the first attachment pad and the second attachment pad displaced from one another along at least a z axis of an xyz Cartesian coordinate system; and
moving at least one of the attachment pads arcuately in a plane intersecting the z axis to increase and decrease a strain on the filter portion to tune the optical filter to the center wavelength of the selected channel.

26. An optical filter for filtering an optical signal, and the optical filter comprising:
an optical fiber with a first side and a second side and a filter portion intermediate the first side and the second side, and the optical fiber for filtering a selected wavelength of the optical signal;
an elongate housing with opposing exposed end portions and said optical fiber affixed at each exposed end portion with the filter portion located between each of the exposed end portions, and the exposed end portions exhibit between them a negative coefficient of thermal expansion sufficient to generate strains on the filter to substantially stabilize the filtered wavelength during temperature variations;
a first anchor pad and a second anchor pad, and opposing sides of said optic fiber adjacent the filter portion affixed to a respective one of the first anchor pad and the second anchor pad within the elongate housing, and the first anchor pad and the second anchor pad at a fixed displacement from one another as measured along a longitudinal axis of said elongate housing and each of the anchor pads displaced along a corresponding normal to the longitudinal axis and at least one of the anchor pads at least initially rotatable about the longitudinal axis in a plane which intersects the longitudinal axis to vary a strain on the filter portion to tune the selected wavelength filtered by the filter portion.

27. The optical filter of claim 26, wherein said filter portion includes a Bragg grating.

28. The optical filter of claim 26, wherein the optical signal includes a plurality of multiplexed channels of an optical communication.

29. The optical filter of claim 28, further comprising
a pair of circulators and each of said pair of circulators coupled to opposing sides of said optic fiber for respectively dropping and adding the selected one among the plurality of channels.

30. An optical filter for filtering an optical signal, and the optical filter comprising:
an optical fiber with an intermediate filter portion, and the optical fiber for transmitting the optical signal and the filter portion for filtering the optical signal; and
an elongate housing defined about a longitudinal axis and including a first anchor pad and a second anchor pad, and opposing sides of said optic fiber adjacent the filter portion affixed to a respective one of the first anchor pad and the second anchor pad within said elongate housing, and each of the anchor pads displaced along a corresponding normal to the longitudinal axis and at least one of the anchor pads at least initially rotatable about the longitudinal axis in a plane intersecting the longitudinal axis to vary a strain on the filter portion to tune a wavelength filtered by the filter portion.

31. An optical filter for filtering an optical signal, and the optical filter comprising:
an optical fiber with an intermediate filter portion, and the optical fiber for transmitting the optical signal and the filter portion for filtering the optical signal; and
an elongate housing defined about a longitudinal axis and including a first anchor pad and a second anchor pad, and opposing sides of said optic fiber adjacent the filter portion affixed to a respective one of the first anchor pad and the second anchor pad within said elongate housing, and at least one of the anchor pads at least initially movable in a plane intersecting the longitudinal axis to vary a strain on the filter portion to tune a wavelength filtered by the filter portion; and the elongate housing including at least three substantially overlapping tubular members substantially concentric about a longitudinal axis and each of said at least three tubular members joined serially to one another to form a "z" shaped cross section with opposing exposed end portions which exhibit between them a negative coefficient of thermal expansion sufficient to generate strains on the filter to substantially stabilize the wavelength filtered by the filter portion during temperature variations.

32. An optical filter for filtering an optical signal, and the optical filter comprising:
an optical fiber with an intermediate filter portion, and the optical fiber for transmitting the optical signal and the filter portion for filtering the optical signal; and
an elongate housing defined about a longitudinal axis and including a first anchor pad and a second anchor pad, and opposing sides of said optic fiber adjacent the filter portion affixed to a respective one of the first anchor pad and the second anchor pad within said elongate housing, and at least one of the anchor pads at least initially movable in a plane intersecting the longitudinal axis to vary a strain on the filter portion to tune a wavelength filtered by the filter portion; and the elongate housing including at least three "C" shaped members joined serially to one another to form a "Z" shaped cross section with opposing end portions which exhibit between them a negative coefficient of thermal expansion sufficient to generate strains on the filter to substantially stabilize the wavelength filtered by the filter portion during temperature variations.

33. The optical filter of claim 32, wherein said filter portion includes a Bragg grating.

34. The optical filter of claim 32, wherein the optical signal includes a plurality of multiplexed channels of an optical communication.

35. The optical filter of claim 34, further comprising:

a pair of circulators and each of said pair of circulators coupled to opposing sides of said optic fiber for respectively dropping and adding the selected one among the plurality of channels.

36. The optical filter of claim 31, further comprising:

a pair of end caps each dimensioned to couple with opposing ends of said at least three tubular members and each of the end caps defining an opening therein for positioning the optic fiber along a corresponding normal to the longitudinal axis and at least one of the end caps at least initially rotatable about the longitudinal axis to vary a strain on the filter portion to tune the wavelength filtered by the filter portion.

37. The optical filter of claim 31, wherein:

an exterior one of said at least three tubular members together with an interior one of said at least three tubular members exhibits a first coefficient of thermal expansion, and an intermediate one of said at least three tubular members located between said exterior one and said interior one of said at least three tubular members exhibits a second coefficient of thermal expansion greater than the first coefficient of thermal expansion.

38. The optical filter of claim 31, wherein:

a material component of the exterior one of said at least three tubular members together with an interior one of said at least three tubular members includes at least one of: quartz, Invar, ceramic, and graphite.

39. The optical filter of claim 31, wherein:

a material component of the intermediate one of said at least three tubular members includes at least one of: copper, aluminum, stainless steel and magnesium.

40. The optical filter of claim 32, wherein:

an exterior one of said at least three "C" shaped members together with an interior one of said at least three "C" shaped members exhibits a first coefficient of thermal expansion, and an intermediate one of said at least three "C" shaped members located between said exterior one and said interior one of said at least three "C" shaped members exhibits a second coefficient of thermal expansion greater than the first coefficient of thermal expansion.

41. The optical filter of claim 40, wherein:

a material component of the exterior one of said at least "C" shaped members together with an interior one of said at least three "C" shaped members includes at least one of: quartz, Invar, ceramic, and graphite.

42. The optical filter of claim 40, wherein:

a material component of the intermediate one of said at least three "C" shaped members includes at least one of: copper, aluminum, stainless steel and magnesium.

43. A method for compensating an optical filter to a selected wavelength and the method for compensating comprising the acts of:

tensioning an optical filter to a first strain level at which a wavelength of light filtered by the filter approximates a wavelength of the selected wavelength;

locating a first attachment pad displaced from an origin along the x axis and a second attachment pad displaced from the origin substantially along the y axis;

affixing opposing sides of the optical filter to the first attachment pad and the second attachment pad displaced from one another along at least a "z" axis of an xyz Cartesian coordinate system; and moving at least one of the attachment pads arcuately in a plane intersecting the z axis to increase and decrease a strain on the filter portion to tune the optical filter to the selected wavelength.

44. A means for compensating an optical filter to a selected channel within a plurality of multiplexed channels of an optical communication and the means for compensating comprising:

means for tensioning an optical filter to a first strain level at which a wavelength of light filtered by the filter approximates a center wavelength of the selected channel;

means for locating a first attachment pad displaced from an origin along the x axis and a second attachment pad displaced from the origin substantially along the y axis;

means for affixing opposing sides of the optical filter to the first attachment pad and the second attachment pad displaced from one another along at least a z axis of an xyz Cartesian coordinate system; and means for moving at least one of the attachment pads arcuately in a plane intersecting the z axis to increase and decrease a strain on the filter portion to tune the optical filter to the center wavelength of the selected channel.

* * * * *